United States Patent
Liu et al.

(10) Patent No.: US 9,227,695 B2
(45) Date of Patent: Jan. 5, 2016

(54) DRIVE ASSEMBLY OF AN ELECTRIC BICYCLE

(71) Applicants: Chun-Hsiang Liu, Tapei (TW); Chung-Li Chin, New Taipei (TW); Chin Shu Chang, Changhua (TW); Yu Li Chen, Changhua (TW)

(72) Inventors: Chun-Hsiang Liu, Taipei (TW); Chung-Li Chin, New Taipei (TW)

(73) Assignees: Chun-Hsiang Liu, Taipei (TW); Chin Shu Chang, Changhua (TW); Chung-Li Chin, New Taipei (TW); Yu Li Chen, Changhua (TW)

( * ) Notice: Subject to any disclaimer, the term of this patent is extended or adjusted under 35 U.S.C. 154(b) by 0 days.

(21) Appl. No.: 14/164,184

(22) Filed: Jan. 25, 2014

(65) Prior Publication Data

US 2015/0210349 A1 Jul. 30, 2015

(51) Int. Cl.
*B62M 6/55* (2010.01)
(52) U.S. Cl.
CPC ........................................ *B62M 6/55* (2013.01)
(58) Field of Classification Search
CPC ........................................................ B62M 6/55
USPC ........................................... 180/206.3, 206.4
See application file for complete search history.

(56) References Cited

U.S. PATENT DOCUMENTS

| | | | |
|---|---|---|---|
| 2,553,465 A * | 5/1951 | Monge | 475/3 |
| 5,829,546 A * | 11/1998 | Tseng | 180/206.4 |
| 5,901,807 A * | 5/1999 | Tseng | 180/206.3 |
| 6,080,073 A * | 6/2000 | Liu et al. | 475/4 |
| 6,230,586 B1 * | 5/2001 | Chang | 74/625 |
| 6,263,993 B1 * | 7/2001 | Lin | 180/206.4 |
| 6,554,730 B1 * | 4/2003 | Sakai et al. | 475/195 |
| 2006/0208450 A1 * | 9/2006 | Rizzetto | 280/210 |
| 2014/0196970 A1 * | 7/2014 | Biechele | 180/206.4 |
| 2015/0011346 A1 * | 1/2015 | MacMartin | 475/4 |

* cited by examiner

*Primary Examiner* — Tony Winner
(74) *Attorney, Agent, or Firm* — Guice Patents PLLC (57) ABSTRACT

A drive assembly of an electric bicycle is disclosed. A shell tube of an electric bicycle is transfixed with a crank shaft sheathed with an outer shaft set. The outer shaft set links to a tubular motor set. A first side of the crank shaft is provided with a left positioning set sheathed and limited in a left hole of the shell tube. A second side of the crank shaft is provided with a right positioning set sheathed and limited in a right hole of the shell tube. The right positioning set is fixed with a chain wheel set. A displacement of the crank shaft pulled by a bicycle chain is detected by a torque detection unit, and a torque is accessed by a control unit based upon the displacement to control the output power of the tubular motor set, thereby assisting pedaling the bicycle with feet.

7 Claims, 7 Drawing Sheets

DRIVE ASSEMBLY OF AN ELECTRIC BICYCLE

BACKGROUND OF THE INVENTION a) Field of the Invention

The present invention relates to a drive assembly of an electric bicycle, and more particularly to a drive assembly of an electric bicycle which is able to assist pedaling the bicycle with feet, wherein a displacement of a crank shaft pulled by a bicycle chain is used to acquire a torque, such that an output power of a tubular motor set can be controlled, thereby achieving a purpose of assisting pedaling the bicycle with feet.

b) Description of the Prior Art

A bicycle is not only a vehicle of transportation, but also sport equipment for spending a leisure time. The bicycle is primarily operated by pedaling with a rider's feet to drive a chain wheel set that links to a bicycle chain, thereby driving a rear wheel to rotate, as a power for moving the bicycle forward. However, the road condition that an ordinary bicycle travels is not always the same; sometimes the road is smooth, and sometimes the road is a ramp. When riding the bicycle for a long distance, some people with an inferior physical strength, such as elders, women or children, may be incapable of completing the whole journey. Therefore, there are electric bicycles to solve this kind of problem.

The existing electric bicycle is operated primarily by an electric motor which generates a power to drive the chain wheel set to move a bicycle chain that links to and rotates a rear wheel to move the bicycle forward. The related technical means can be referred to in prior arts of U.S. Pat. No. 6,230,586, U.S. Pat. No. 8,418,584, EP 11164464.7, and TW 201238831A1.

As mentioned above, in addition to providing for manually pedaling a bicycle, the electric bicycle can even allow the rider to choose using electricity as a power source for moving the bicycle forward. Nevertheless, the problem lies in that the design concept of the ordinary electric bicycle does not take the ability of pedaling the bicycle with feet into consideration, but only allows the rider to choose one operation mode for driving the bicycle forward between the manual pedaling and the electric power. The prior arts U.S. Pat. No. 6,230,586, U.S. Pat. No. 8,418,584, EP 11164464.7, and TW 201238831A1 also belong to this design concept. Yet, for a true lover of riding a bicycle, it will basically make no difference from riding a motorcycle if the bicycle can be only ridden by the electric power, and the rider will not enjoy the pleasure of pedaling a bicycle and the sense of accomplishment in conquering a physical limit at all.

Accordingly, there are vendors who utilize a detected rotational torque of the crank shaft of the bicycle to control the output power of the electric motor, serving as a power to assist pedaling the bicycle with feet. The related technical applications can be referred to in prior arts TW 451316 and TW 453843. However, the common idea of these prior arts is the detection of the rotational torque of the crank shaft, which is not able to accurately detect the ability of pedaling a bicycle of a rider. To put it simply, although the rotation of the crank shaft is indeed related to the ability of pedaling a bicycle, the conventional method for detecting the torque cannot detect whether the rider is difficult in pedaling the bicycle, and even the rotational torque and the rotational speed of the crank shaft are under a same condition, the physical burden of pedaling the bicycle is not the same for all the riders. This is the blind spot of the existing method that uses the torque detection to determine the ability of pedaling the bicycle.

Furthermore, most of the existing torque detection devices and speed detection devices are hung externally and therefore can be damaged easily by collision or an external force. In addition, there are some shortcomings when hanging these devices externally; for example, the accuracy of detection can be easily affected by other external factors mixing with other parameters, during the detection process.

SUMMARY OF THE INVENTION

Accordingly, the primary object of the present invention is to provide a drive assembly of an electric bicycle which is able to assist pedaling the bicycle with feet, and more particularly to a drive assembly of an electric bicycle which provides an electric power in time truly based upon the ability of pedaling the bicycle of a rider, thereby achieving a purpose of assisting pedaling the bicycle with feet.

To achieve the aforementioned object, a drive assembly of an electric bicycle, according to the present invention, includes a shell tube, a crank shaft, an outer shaft set, a tubular motor set, a left positioning set, a right positioning set, a chain wheel set, a control unit and a torque detection unit.

The shell tube provides for installing the crank shaft and an interior of the shell tube is provided with a shaft-hole chamber. A left side of the shaft-hole chamber is provided with a left hole, a right side of the shaft-hole chamber is provided with a right hole, and an upper side of the shaft-hole chamber is provided with an upper through-hole. The shell tube is provided with a bottom-hole seat.

The crank shaft is axially transfixed in the shaft-hole chamber of the shell tube, a first side of the crank shaft penetrates out of the left hole of the shell tube, and a second side of the crank shaft penetrates out of the right hole of the shell tube.

The outer shaft set is sheathed at the crank shaft and includes an outer shaft tube, a two-way thrust bearing, a large bevel gear and a needle bearing. The outer shaft tube is provided with a shaft hole for transfixing with the crank shaft. An end of the shaft hole is installed with the two-way thrust bearing; whereas, the large bevel gear is fixed at a side of the outer rim of the outer shaft tube.

The tubular motor set includes a motor, a motor fixation seat and a frame connecting seat. The motor is disposed in a tube body and is linked to a spindle to output a power. The spindle is provided with a small bevel gear which is gnawed with the large bevel gear. The motor fixation seat is fixed at the shell tube, and the frame connecting seat provides for sheathing and fixing the tube body at the shell tube.

The left positioning set is transfixed by the crank shaft, and sheaths and limits the first side of the crank shaft at the left hole of the shell tube.

The right positioning set is transfixed by the crank shaft, and sheaths and limits the second side of the crank shaft at the right hole of the shell tube. The right positioning set includes at least a first isolator, a ball bearing, a second oil seal, an outer annular sleeve, a second isolator, an isolator outer collar, a chain wheel seat, and a chain wheel seat retaining ring. The chain wheel seat retaining ring is fixed at the second side of the crank shaft, and the first isolator is used to limit the outer shaft tube to drive in one direction. The second isolator is sheathed in the isolator outer collar and the isolator outer collar is fixed in an inner slot of the chain wheel seat.

The chain wheel set is formed by at least one chain wheel, and is fixed at the chain wheel seat and is limited by the second isolator to drive in one direction.

The control unit is an electric circuit capable of computing and comparing. The control unit controls an operation and an output power of the motor.

The torque detection unit is installed on the bottom-hole seat of the shell tube. The torque detection unit is connected electrically with the control unit to detect the displacement of the crank shaft pulled by a bicycle chain. The displacement is provided to the control unit to access a torque, so as to control the operation and the output power of the motor.

The bottom-hole seat of the abovementioned shell tube is covered by a cover plate.

The abovementioned outer shaft tube is provided with a shaft hole for transfixing with the crank shaft, an end of the shaft hole is provided with a bearing installation member, and the other end of the shaft hole is provided with a sleeve installation member.

The abovementioned left positioning set includes at least a first oil seal and a bearing.

The abovementioned torque detection unit includes a top pin and a strain gauge.

The drive assembly of an electric bicycle, according to the present invention, further includes a rotational speed sensor. The rotational speed sensor is installed on the bottom-hole seat of the shell tube, and is connected electrically with the control unit to detect the rotation and the speed of the crank shaft of the bicycle. The rotational speed sensor includes a screen and a photosensor.

The right hole of the abovementioned shell tube is an eccentric hole, and an eccentric gap between the longest radius and the shortest radius of the eccentric hole is set at 1.5 mm-2.5 mm.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Referring to FIGS. 1 to 4, a drive assembly of an electric bicycle, according to the present invention, comprises a shell tube 1, a crank shaft 2, an outer shaft set 3, a tubular motor set 4, a left positioning set 5, a right positioning set 6, a chain wheel set 7, a control unit 8 and a torque detection unit A.

The shell tube 1 provides for installing the crank shaft 2 and an interior of the shell tube 1 is provided with a shaft-hole chamber 10. A left side of the shaft-hole chamber 10 is provided with a left hole 11, a right side of the shaft-hole chamber 10 is provided with a right hole 12, and an upper side of the shaft-hole chamber 10 is provided with an upper through-hole 13. A bottom of the shell tube 1 is concaved with a bottom-hole seat 14; the bottom-hole seat 14 is covered by a cover plate 15 and is provided with a first through-hole 141 and a second through-hole 142.

The crank shaft 2 is axially transfixed in the shaft-hole chamber 10 of the shell tube 1, a first side 21 of the crank shaft 2 penetrates out of the left hole 11 of the shell tube 1, and a second side 22 of the crank shaft 2 penetrates out of the right hole 12 of the shell tube 1.

The outer shaft set 3 is sheathed at an outer rim of the crank shaft 2 and includes an outer shaft tube 31, a two-way thrust bearing 32, a large bevel gear 33 and a needle bearing 34. The outer shaft tube 31 is provided with a shaft hole 311 for transfixing with the crank shaft 2. An end of the shaft hole 311 is provided with a bearing installation member 312 to install the two-way thrust bearing 32; whereas, the other end of the shaft hole 311 is provided with a sleeve installation member 313 to sheath the needle bearing 34. The large bevel gear 33 is fixed at a side of the outer rim of the outer shaft tube 31.

The tubular motor set 4 includes a motor 41, a motor fixation seat 42 and a frame connecting seat 43. The motor 41 is disposed in a tube body C and is linked to a spindle 411 to output a power. The spindle 411 is provided with a small bevel gear 412 which is gnawed with the large bevel gear 33. The motor fixation seat 42 is provided with plural connection holes 421 for insertion with plural lock pins 422, thereby fixing the motor 41 at the shell tube 1. The frame connecting seat 43 is provided with a sheath hole 431 for sheathing the tube body C. A periphery of the frame connecting seat 43 is provided with plural lock holes 432 for locking the plural bolts 433 into plural screw holes 16 at a top of the shell tube 1, thereby fixing the frame connecting seat 43 at the shell tube 1.

The left positioning set 5 is transfixed by the crank shaft 2, and sheaths and limits the first side 21 of the crank shaft 2 at the left hole 11 of the shell tube 1. The left positioning set 5 includes at least a first oil seal 51 and a bearing 52.

The right positioning set 6 is transfixed by the crank shaft 2, and sheaths and limits the second side 22 of the crank shaft 2 at the right hole 12 of the shell tube 1. The right positioning set 6 includes at least a first isolator 61, a ball bearing 621, a second oil seal 622, an outer annular sleeve 63, a second isolator 64, an isolator outer collar 65, a chain wheel seat 66, and a chain wheel seat retaining ring 67. The chain wheel seat retaining ring 67 is fixed at the second side 22 of the crank shaft 2, and the first isolator 61 is used to limit the outer shaft tube 31 to drive in one direction. The second isolator 64 is sheathed in the isolator outer collar 65 and the isolator outer collar 65 is fixed in an inner slot 661 of the chain wheel seat 66.

The chain wheel set 7 is formed by at least one 71, 72, 73. The chain wheel set 7 is fixed at the chain wheel seat 66 and is limited by the second isolator 64 to drive in one direction.

The control unit 8 is an electric circuit unit capable of computing and comparing. The control unit 8 controls an operation and an output power of the motor 41.

Figure 1:
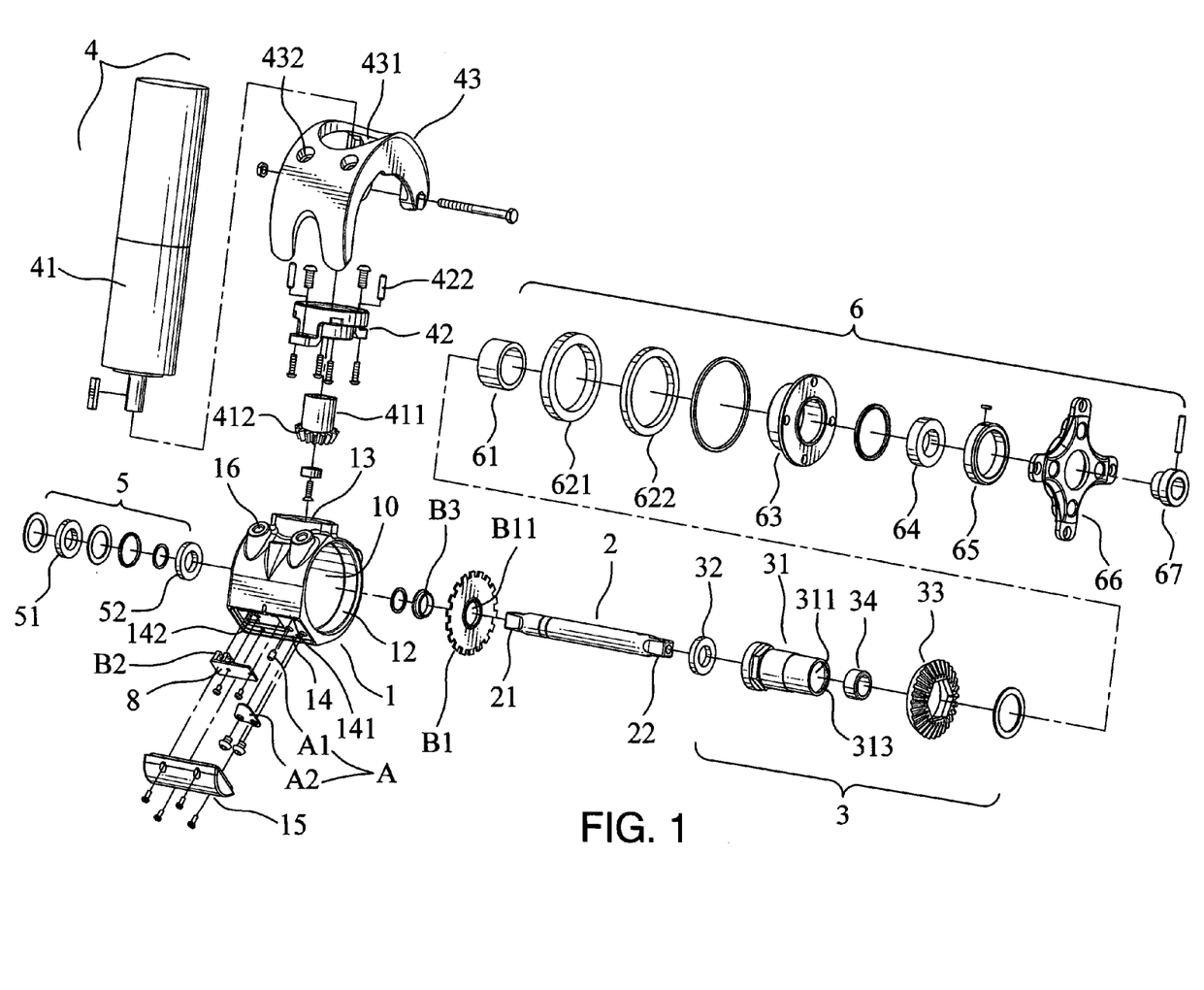
FIG. 1 shows a three-dimensional exploded view of the present invention.
Figure 2:
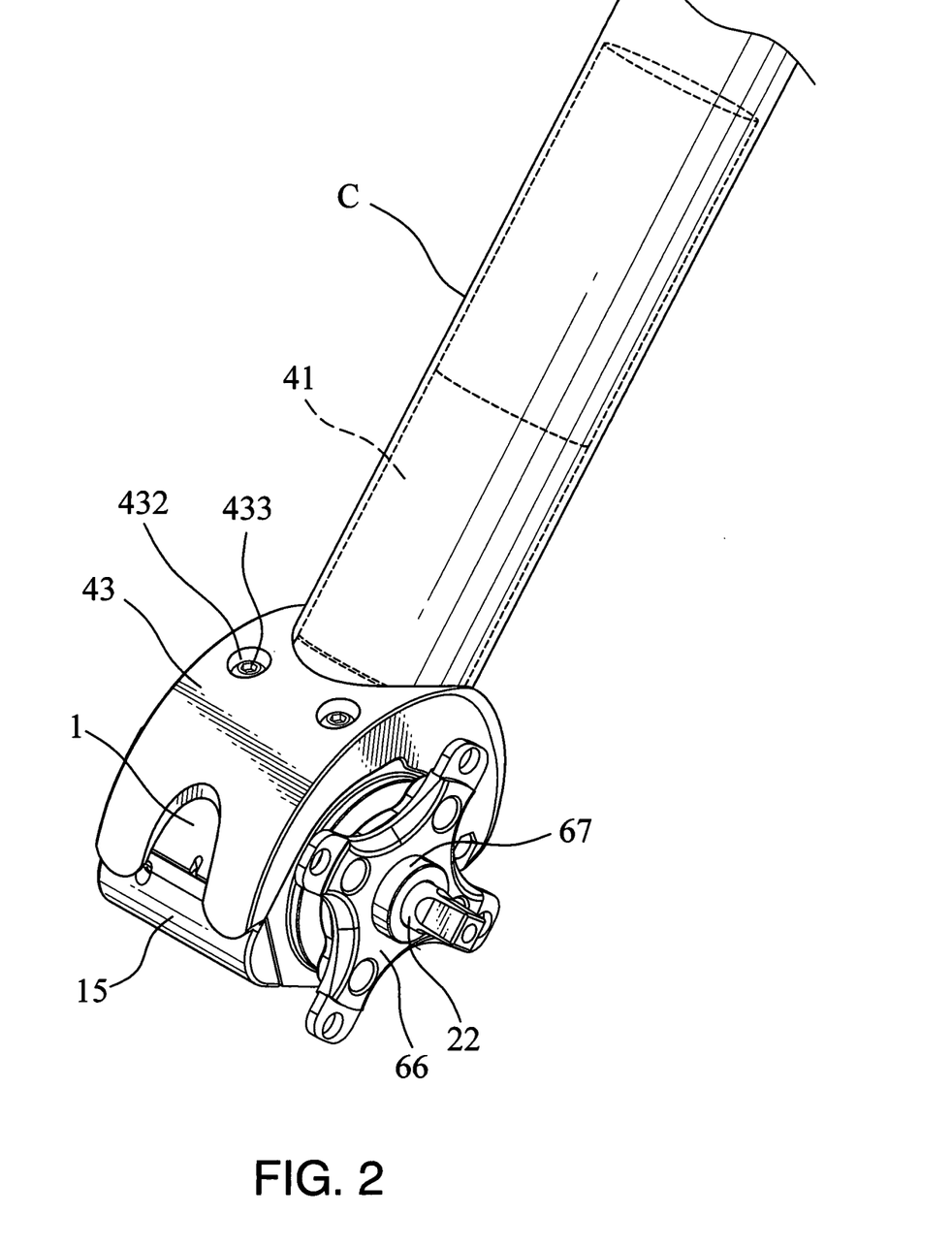
FIG. 2 shows a three-dimensional schematic view of the present invention.
Figure 3:
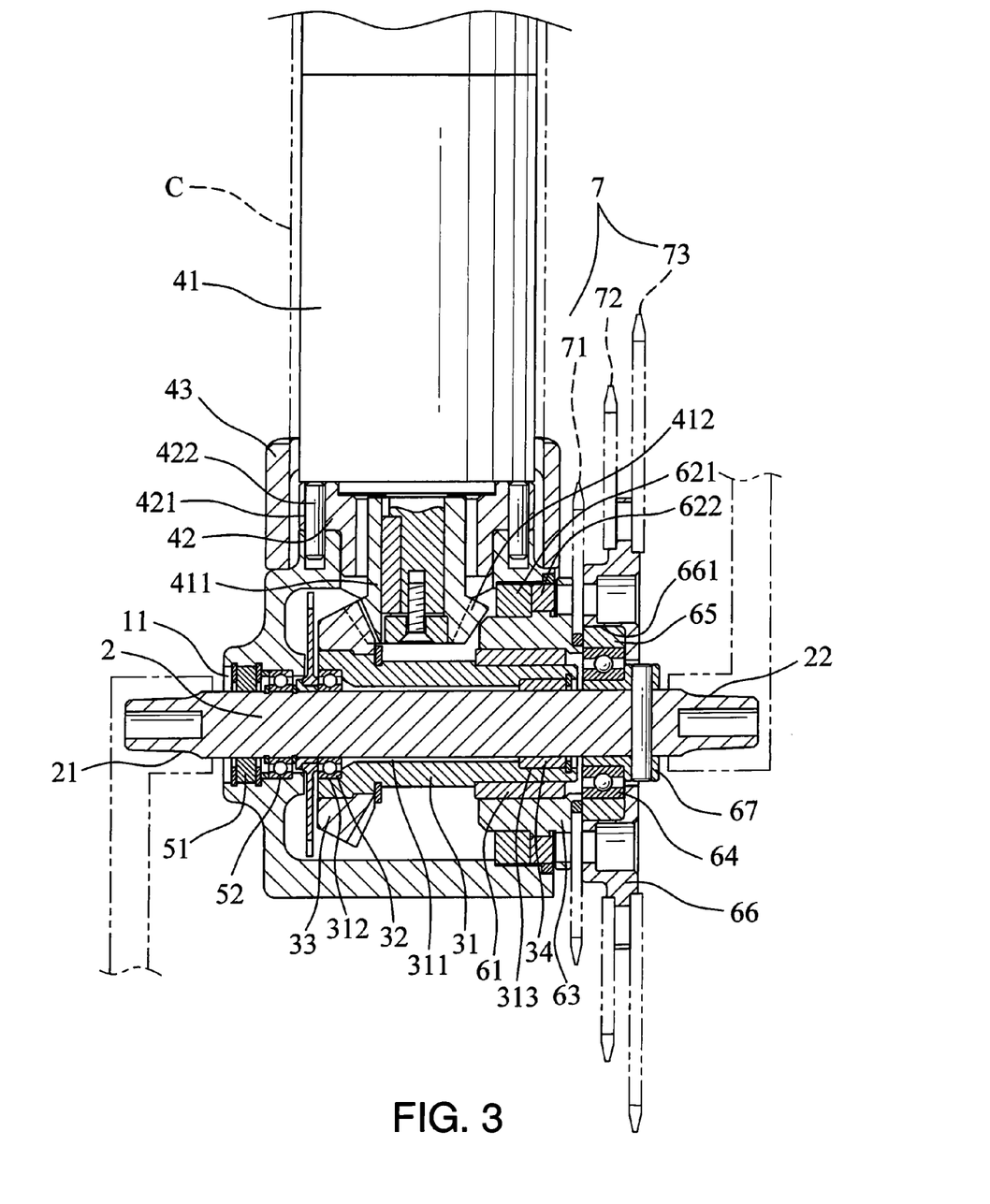
FIG. 3 shows a cutaway view of assembly of the present invention.
Figure 4:
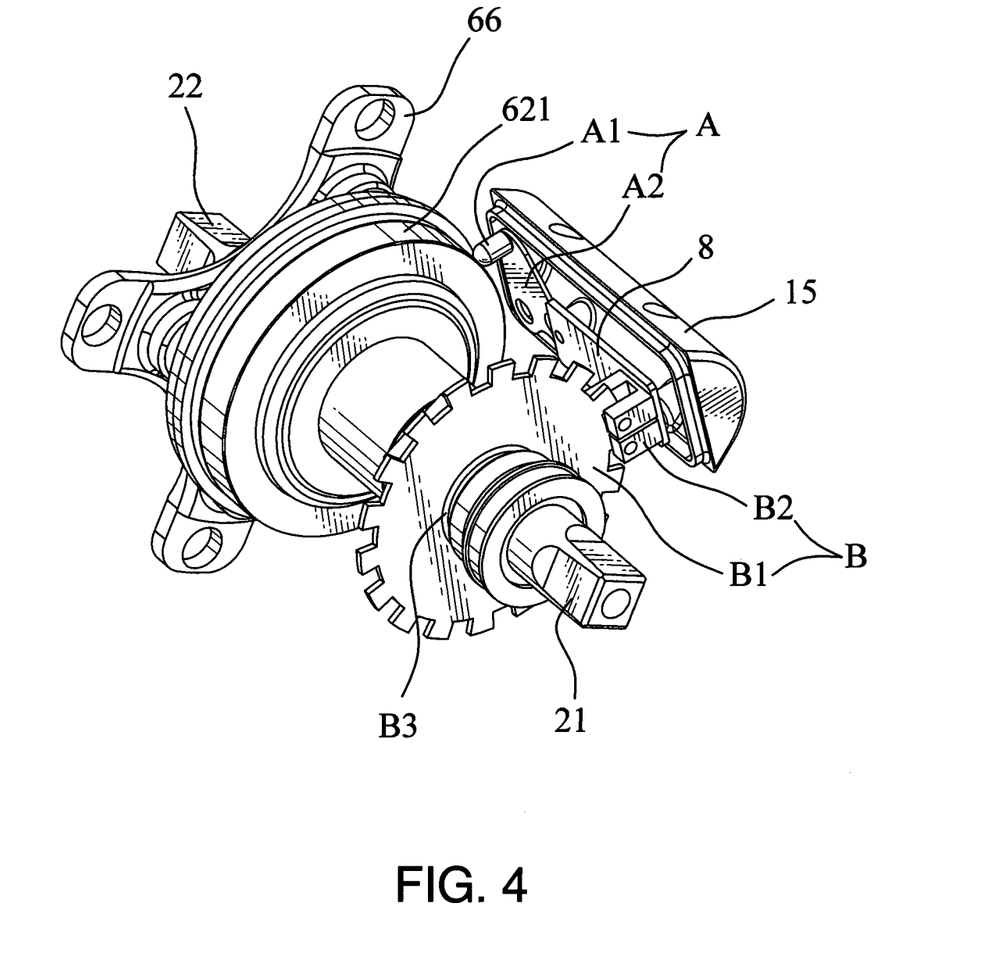
FIG. 4 shows a local three-dimensional schematic view of the present invention.
Figure 5:
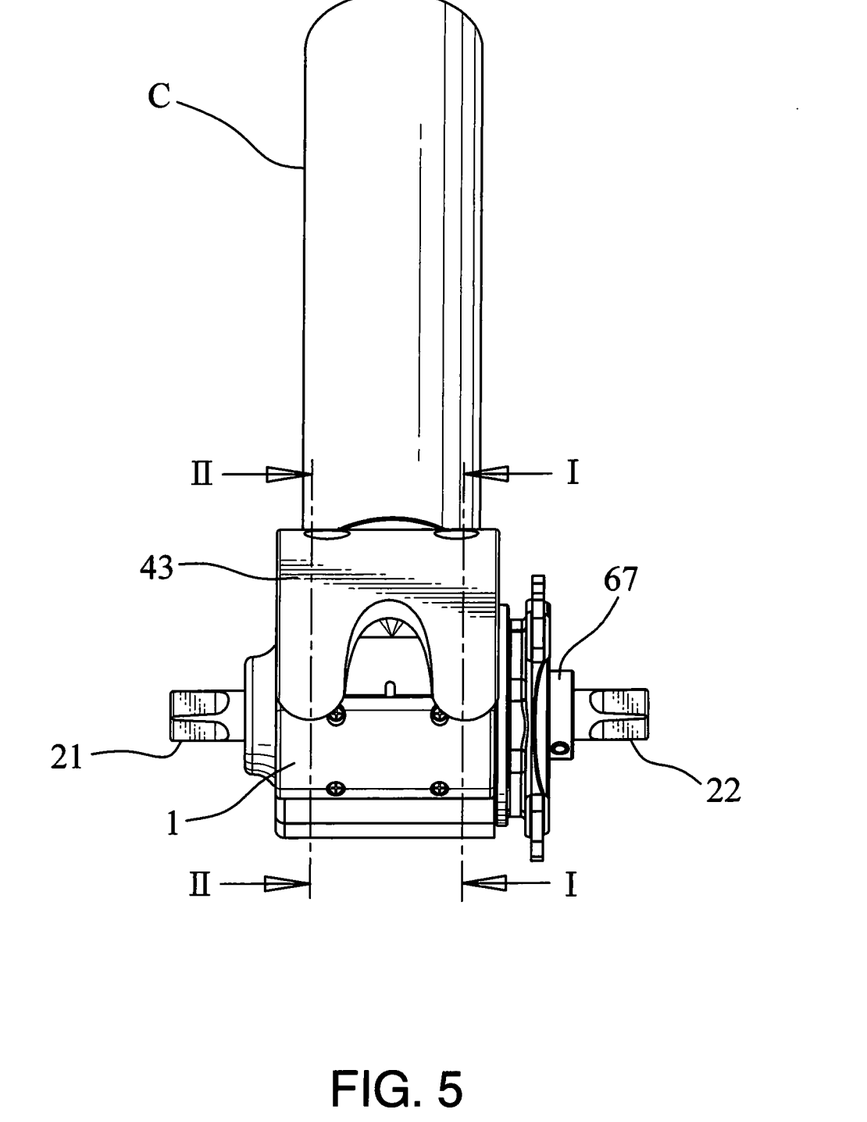
FIG. 5 shows a plan view of assembly of the present invention.
Figure 6:
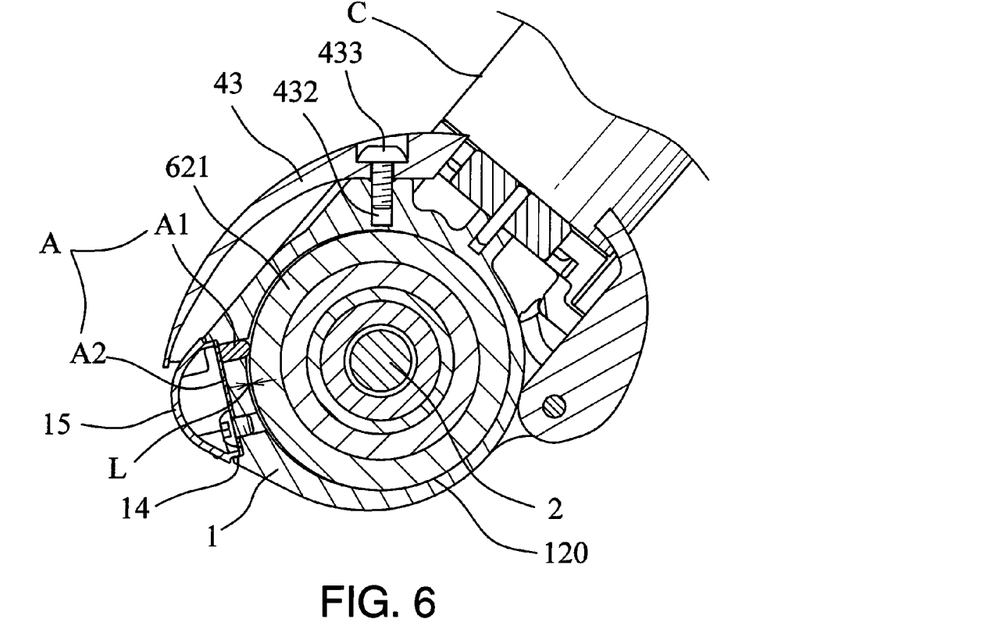
FIG. 6 shows a cutaway view along the line I-I in FIG. 5.

The torque detection unit A is installed in a bottom-hole seat 14 that is concaved at the bottom of the shell tube 1. The torque detection unit A is connected electrically with the control unit 8 to detect the displacement of the crank shaft 2 pulled by a bicycle chain. The displacement is provided to the control unit 8 to access a torque, thereby controlling the operation and output power of the motor 41. The torque detection unit A includes a top pin A1 and a strain gauge A2 having a metallic spring leaf. The top pin A1 is transfixed in the first through-hole 141, and a front end of the top pin A1 is abutted at an outer rim of the ball bearing 621. A bottom end of the top pin A1 is fixed at the strain gauge A2 (as shown in FIG. 5 and FIG. 6).

Figure 8:
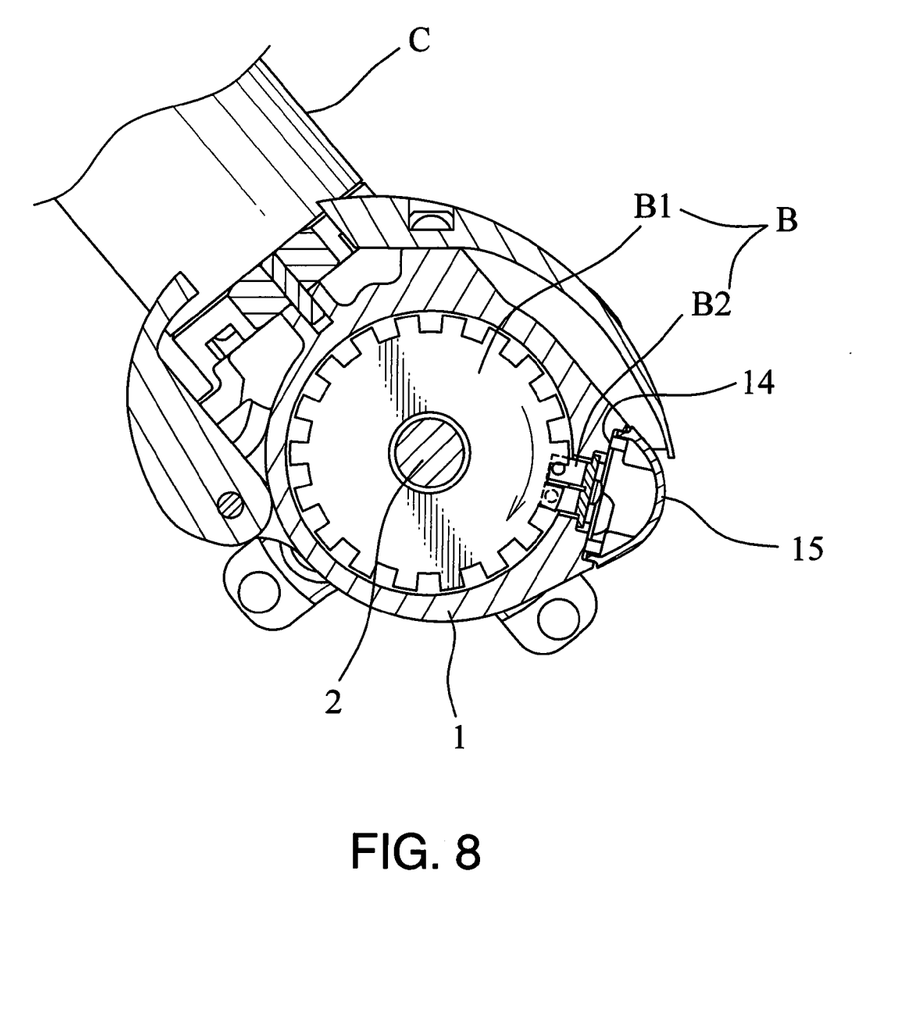
FIG. 8 shows a cutaway view along the line II-II in FIG. 5.

Referring to FIG. 8, the drive assembly of an electric bicycle, according to the present invention, further comprises a rotational speed sensor B. The rotational speed sensor B is installed in the bottom-hole seat 14 of the shell tube 1 and is connected electrically with the control unit 8 to detect the rotation and the speed of the crank shaft 2 of the bicycle. The rotational speed sensor B includes a screen B1 and a photosensor B2. A center of the screen B1 is provided with a sheath hole B11 for sheathing and fixing an inner sleeve B3 on the crank shaft 2. The photosensor B2 is protruded into the second through-hole 142 of the bottom-hole seat 14.

The torque detection unit A and the rotational speed sensor B, according to the present invention, are installed in the shell tube 1 and therefore can be protected by the shell tube 1. This is totally different from an ordinary electric bicycle that the electric sensors are hung externally.

Figure 7:
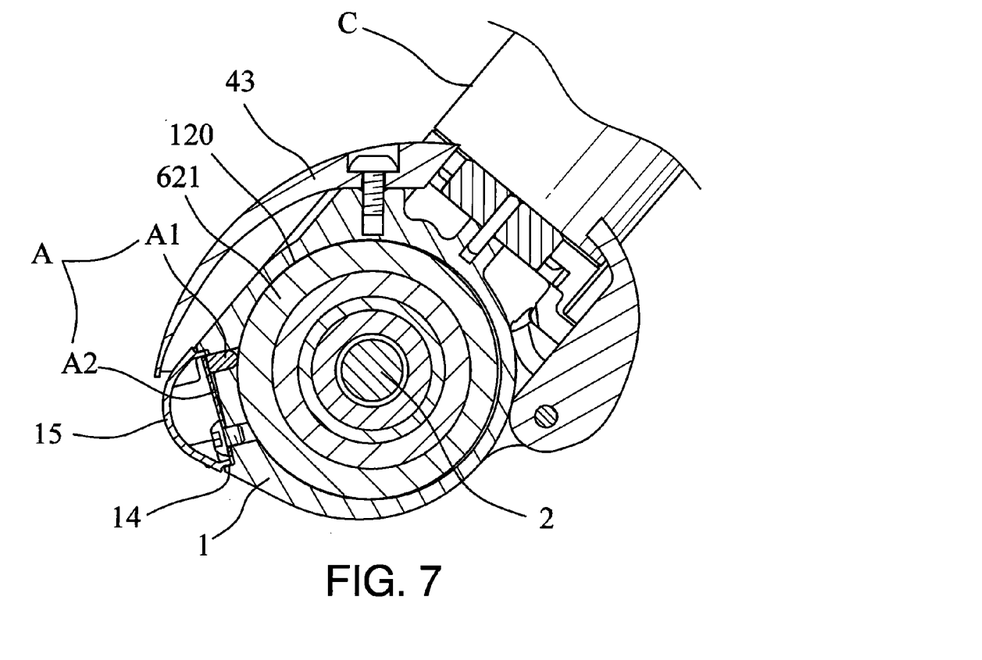
FIG. 7 shows a schematic view of an operation of a torque detection unit of the present invention.

The right hole 12 of the shell tube 1, according to the present invention, is an eccentric hole 120. The eccentric gap L between the longest radius and the shortest radius of the eccentric hole 120 is set at 1.5 mm-2.5 mm (depending upon the specification of the bicycle). The longest radius is preferably set at a circumference of the eccentric hole 120 in a horizontal direction (as shown in FIG. 6 and FIG. 7). This design facilitates the strain gauge A2 to accurately detect the displacement change of the crank shaft 2 pulled by the chain while pedaling a bicycle. In other words, the chain wheels 71, 72, 73 are pulled by the chain to drive the crank shaft 2 to displace, allowing the top pin A1 to link to the strain gauge A2 to result in a deformation. Based upon the deformation of the strain gauge A2, the control unit 8 can access the torque and the magnitude of the torque will reflect the physical condition of the rider. Therefore, the mechanism design of the present invention is completely different from that of the prior arts wherein the torque is computed while detecting the rotation of the crank shaft 2.

The drive assembly of an electric bicycle, according to the present invention, provides for using the torque detection unit A to detect the displacement of the crank shaft 2 pulled by the bicycle chain, allowing the control unit 8 to access the torque according to the displacement. When the bicycle chain is subjected to a force to pull the crank shaft 2, as the right hole 12 of the shell tube 1 is an eccentric hole 120, a configured eccentric gap L exists between the eccentric hole 120 and the ball bearing 621, such that the crank shaft 2 can drive the ball bearing 621 synchronously to displace and compress the top pin A1 abutted at the outer rim of the ball bearing 621, and to compress correspondingly the strain gauge A2 to deform to result in a deformation (as shown in FIGS. 5 to 7), after the crank shaft 2 has been subjected to a force. In addition, the signal of deformation is transmitted to the control unit 8 and the control unit 8 will access the torque of pedaling based upon this change of deformation, and control the operation and the output power of the motor 41 according to the magnitude of the torque. Therefore, the physical condition of the rider can be reflected in time to provide the electric power that the rider needs.

When driving with the electric power, the motor 41 rotates (or drives) by receiving the control signal of the control unit 8. On the spindle 411 of the motor 41, the small bevel gear 412 is gnawed with the large bevel gear 33 to drive the outer shaft tube 31 of the outer shaft set 3 to link with the chain wheel set 7 to rotate, so that the rider can be assisted by the electric power, thereby reducing the physical burden effectively while pedaling.

The benefit of the present invention lies in that the electric power can be used to assist pedaling a bicycle with feet. Therefore, when the crank shaft 2 does not rotate, the motor 41 will not output any power. To assure achieving this operation, the rotation and the speed of the crank shaft 2 are detected by the rotational speed sensor B and when the control unit 8 does not receive the rotational signal of the crank shaft 2, the motor 41 will not be driven to operate, thereby assuring the safety of driving with the electric power.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A drive assembly of an electric bicycle comprising a shell tube, a crank shaft, an outer shaft set, a tubular motor set, a left positioning set, a right positioning set, a chain wheel set, a control unit and a torque detection unit, wherein:

the shell tube provides for installing the crank shaft, and an interior of the shell tube is provided with a shaft-hole chamber, with that a left side of the shaft-hole chamber is provided with a left hole, a right side of the shaft-hole chamber is provided with a right hole, an upper side of the shaft-hole chamber is provided with an upper through-hole, and the shell tube is provided with a bottom-hole seat;

the crank shaft is axially transfixed in the shaft-hole chamber of the shell tube, a first side of the crank shaft penetrates out of the left hole of the shell tube, and a second side of the crank shaft penetrates out of the right hole of the shell tube;

the outer shaft set is sheathed at the crank shaft and includes an outer shaft tube, a two-way thrust bearing, a large bevel gear and a needle bearing, with that the outer shaft tube is provided with a shaft hole for transfixing with the crank shaft, an end of the shaft hole is installed with the two-way thrust bearing, and the large bevel gear is fixed at a side of the outer rim of the outer shaft tube;

the tubular motor set includes a motor, a motor fixation seat and a frame connecting seat, with that the motor is disposed in a tube body, the motor is linked to a spindle to serve as an output of electric power, the spindle is fixed with a small bevel gear, the small bevel gear is gnawed with the large bevel gear, the motor fixation seat is fixed at the shell tube, and the frame connecting seat provides for sheathing and fixing the tube body at the shell tube;

the left positioning set is transfixed by the crank shaft, and sheathes and limits the first side of the crank shaft at the left hole of the shell tube;

the right positioning set is transfixed by the crank shaft, and sheathes and limits the second side of the crank shaft at the right side of the shell tube, with that the right positioning set includes at least a first isolator, a ball bearing, a second oil seal, an outer annular sleeve, a second isolator, an isolator outer collar, a chain wheel seat and a chain wheel retaining ring, the chain wheel seat retaining ring is fixed at the second side of the crank shaft, the first isolator is used to limit the outer shaft tube to drive in one direction, the second isolator is sheathed in the isolator outer collar, and the isolator outer collar is fixed in an inner slot of the chain wheel seat;

the chain wheel set is formed by at least one chain wheel, is fixed on the chain wheel seat, and is limited by the second isolator to drive in one direction;

the control unit is an electric circuit capable of computing and comparing, and controls the operation and the output power of the motor; and the torque detection unit is installed on the bottom-hole seat of the shell tube, and is connected electrically with the control unit to detect the displacement of the crank shaft pulled by the bicycle chain, allowing the control unit to access the torque according to the computation of the displacement, in order to control the operation and the output power of the motor.

2. The drive assembly of an electric bicycle according to claim 1, wherein the bottom-hole seat is covered by a cover plate.

3. The drive assembly of an electric bicycle according to claim 1, wherein an end of the shaft hole of the outer shaft tube is provided with a bearing installation member, and the other end of the shaft hole is provided with a sleeve installation member.

4. The drive assembly of an electric bicycle according to claim 1, wherein the left positioning set includes at least a first oil seal and a bearing.

5. The drive assembly of an electric bicycle according to claim 1, wherein the torque detection unit includes a top pin and a strain gauge.

6. The drive assembly of an electric bicycle according to claim 1, further comprising a rotational speed sensor, wherein the rotational speed sensor is installed in the bottom-hole seat of the shell tube and is connected electrically with the control unit to detect the rotation and the speed of the crank shaft of the bicycle, with that the rotational speed sensor includes a screen and a photosensor.

7. The drive assembly of an electric bicycle according to claim 1, wherein the right hole of the shell tube is an eccentric hole, and an eccentric gap between the largest radius and the shortest radius of the eccentric hole is set at 1.5 mm-2.5 mm.

\* \* \* \* \*